W. WICKERSHAM.
MARBLE CUTTING MACHINE.
No. 75,230. Patented Mar. 3, 1868.
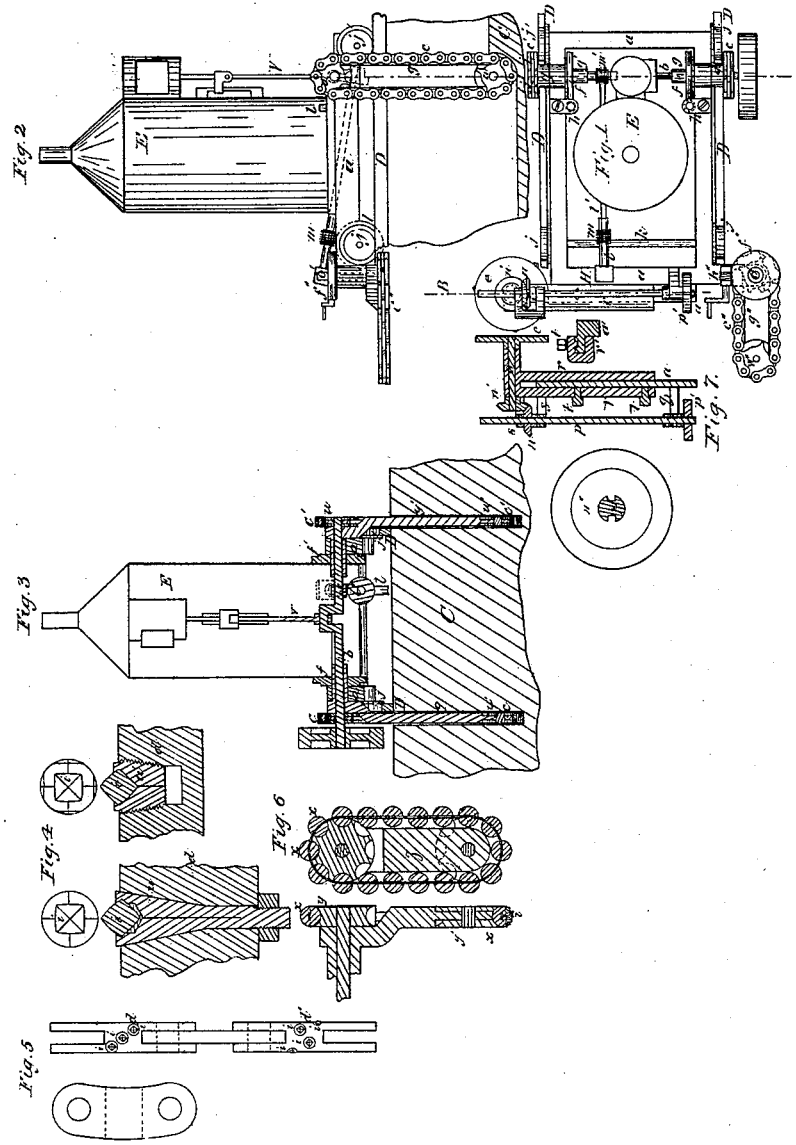
Witnesses
A. D. Parker
John J. Loud
Inventor
William Wickersham

United States Patent Office.

WILLIAM WICKERSHAM, OF BOSTON, MASSACHUSETTS.

*Letters Patent No. 75,230, dated March 3, 1868.*

IMPROVED MARBLE-CUTTING MACHINE.

*The Schedule referred to in these Letters Patent and making part of the same.*

TO ALL WHOM IT MAY CONCERN:

Be it known that I, WILLIAM WICKERSHAM, of Boston, in the county of Suffolk, and State of Massachusetts, have invented a new and improved Marble-Cutting Machine; and I do hereby declare that the following is a full and exact description thereof, reference being had to the annexed drawings, and the letters and figures marked thereon, making a part of this specification.

The nature of my invention consists, first, in placing diamonds in the edges of the links of a chain, and then so arranging the chain in connection with machinery that it can be made to cut perpendicular grooves or channels of any desirable depth into a bed or ledge of marble, and so arranging a chain with a horizontal movement that it can be made to cut horizontal grooves from the bottom of one of the first-named grooves to the bottom of the next groove, thereby cutting the blocks on all sides, or doing all the work of cutting blocks of marble or other stone from the solid ledge; also, cutting channels in marble and other stone horizontally or perpendicularly, by means of a revolving disk, with diamonds in its edge.

The first feature of my invention relates to the union or combination of the diamond to or with a chain for a special purpose, and consists in a device by means of which the diamond is applied to the cutting of blocks of marble out of a ledge, or to the cutting of marble or other stone in any way, when said diamonds are attached to or combined with a chain.

The second feature of my invention relates to the method of securing or attaching the diamonds to the chain, and consists in a slotted tapering clamp, having a cavity at the outer end, of suitable form to receive the diamond, and so arranged in connection with the chain that it may be forced into a tapering hole in the chain by a screw or other equivalent means, thereby firmly clasping the diamond in the clamp, and at the same time securing or attaching it to the chain.

The third feature of my invention relates to the method of applying the diamond chain to the marble, and consists in a chain-gear fastened on to a driving-shaft, and a standard or stud, one end of which is around said driving-shaft, and the other or opposite end from that around said shaft provided with a chain-pulley or gear, and so arranged that when an endless chain is placed around the chain-gear on the driving-shaft, and also around the chain-pulley at the other end of the said standard, said chain will revolve by turning the driving-shaft, and also so arranged that while the driving-shaft is revolving or at rest, the chain-standard can be turned to any position in a plane at right angles to the axis of the driving-shaft, enabling the operator to commence cutting a groove in the marble on the top of the ledge, and gradually cut downwards until said groove has the depth equal to the lower end of the chain-standard in its lowest position, added to the width of the chain.

The fourth feature of my invention relates to the device for moving the chain-standard to any desired position, and holding it in such position while the machine is working, and consists in a screw-gear attached to the chain-standard and around the driving-shaft, together with a screw working in said gear in such manner that by turning the said screw the standard and its chain can be moved to any desirable position, and held firmly while working.

The fifth feature of my invention relates to the device for feeding the machine as it is cutting grooves in the marble from one side of the quarry to the other, and consists in motion being communicated from the driving-shaft to the shaft of two of the trucks on which the machine moves.

The sixth feature of my invention relates to the device for cutting underneath blocks of marble, after their sides and ends have been cut, and consists in the arrangement of an upright shaft, with a chain-standard on the lower end, and in such manner that the chain-standard and its chain can be moved in a horizontal plane to any position underneath a block of marble being cut in the quarry, thereby enabling the machine to cut the blocks of marble off on their under sides while the machine moves from one side to the other of the quarry.

The seventh feature of my invention relates to a device for cutting channels or grooves in marble with a disk or wheel, having diamonds placed in the edge, and consists in having said disk fitted on to the lower end of a shaft so arranged in a horizontal slide, attached to the frame of the machine, that it can be moved laterally while said disk is revolving, thereby causing said disk to cut its way under a block of marble to any desired distance, and then be fed by the machine from one end of the quarry to the other; or, if perpendicular grooves are to be cut, the slide carrying said disk must be arranged on the machine to move perpendicularly, instead of horizontally, as just described.

Figure 1 is a plan view of my machine, as fitted up for cutting perpendicular grooves or channels in a marble ledge; also showing an arrangement of the diamond-chain and diamond-wheel or disk, by which a horizontal channel may be cut.

Figure 2 is a side elevation of the same also showing a section of a ledge of marble into which the machine is cutting.

Figure 3 is a perpendicular section through the driving-shaft in the red line A, fig. 1; also a section of the marble ledge at right angles to the channels.

Figure 4 shows the device for securing the diamonds to the chain.

Figure 5 is a side and edge view of the links of a chain of full size, showing the manner in which the diamonds are placed in the chain.

Figure 6 shows a different kind of chain, in which balls are used instead of links, and these are connected by a spring.

Figure 7 is an arrangement in section, in the red line B, by which a wheel or disk having diamonds set in its edge may be made to cut channels in marble or stone.

At $r'\ a$, fig. 7, is a section of the same in the red line H.

$a$ is the frame to which the machinery is attached. $b$ is the driving-shaft. $c\ c'$ are the two chains on the driving-shaft for cutting perpendicular channels. $d\ d'$ are two links, full size, showing the positions of the diamonds. $e$ is the wheel or disk, with diamonds set in its edge for cutting channels in marble. $f f' f''$ are three screw or worm-gears attached to the chain-standards $g\ g'\ g''$. $h\ h'\ h''$ are the screws which work in and operate said screw-gears. $i\ i$, &c., are the diamonds. $j\ j\ j'\ j'$ are the trucks. $k$ is the truck-shaft, which carries the screw-gear $l$ for feeding the machine along. $m\ m'$ are screws which work in and operate the screw-gears $l\ l''$. $n\ n'$ are two cone-gears for giving motion to the diamond-disk $e$, through the shaft $o$. $p$ is a shaft having a groove in each side, into which projections in the hole of the gear $n$ extend, as shown on a large scale at $n''$, fig. 7, so as to turn said gear when in any position on the shaft. This shaft $p$ is attached, by a stud, $q$, to the frame $a$ at one end, and at the other end is attached to the slide $r$ by two studs, $s\ s$, one of which is on each side of the gear $n$, and all arranged in such manner that when the slide $r$, which carries the disk $e$, is moved to any position in the direction of the shaft $p$, the gears $n$ and $n'$ will continue in connection. The slide $r$ is secured to the frame $a$, while the machine is feeding along, by the set-screws $t\ t$. $u\ u'$ are clamps for holding the diamonds in their places in the links of the chain. $v$ is the connection-rod of the steam-engine working on the crank of the driving-shaft $b$. $w$ is the chain-gear, and $w'$ is the chain-pulley for the perpendicular chains, and $w''$ is the chain-pulley for the horizontal chain. $x\ x$, &c., are balls which are substituted for the links of the chain. They have diamonds placed in them in such manner that when joined together, as in fig. 6, by a spring, and made to revolve, they will cut a groove in marble as wide as the diameter of the balls. $y\ y'$ are the chain-gears, and $z$ the chain-standard. C is a section of a ledge of marble through which the machine is cutting. D is the track, and E the engine. The diamonds are placed in the chain from one side to the other, in the outer edge of the link, as shown at $i\ i\ i$, $d$, fig. 5, and if these do not occupy all the space in the thickness of the chain they are placed in next or other links, as shown at $i\ i\ i\ i$, $d'$, fig. 5; also, they are shown on a small scale at $i\ i$, on the upper part of the chain $c'$, fig. 1. This chain $c$, thus provided with diamonds, is placed in the machine on a chain-gear, $w$, on the driving-shaft $b$, and also placed around a chain-gear or pulley, $w'$, on the outer end of the chain-standard $g$, the other end of which standard is fitted on to the shaft $b$, but back of or nearer the middle of the shaft than said chain-gear, in such manner that it, together with its chain, can be moved to any position in a plane at right angles to the axis of the shaft, as shown in figs. 1, 2, and 3. The chain-standard $g''$ and its chain $c''$ have the same movement around the driving-shaft $o'$ as that just described, except that it moves in a horizontal plane.

I secure the diamonds into the chain by means of a clamp, $u$, in the upper end of which a cavity is cut out to suit the form of the diamond. The clamp tapers towards the other end into a shank, on which a screw is cut which is provided with a nut. The clamp is slotted from the top nearly to the bottom, in such manner that the sides may be sprung out to admit the diamond into its cavity. When this is done the hole is made in the link of the chain $d$, with a suitable taper for the clamp, which, being placed in the link, has its nut at the lower end turned until the diamond is clasped with sufficient force to be kept in its position while performing its work. At $u'$, fig. 4, is shown, in section and top view, a clamp somewhat different, which is used where a shank cannot extend through the link. This clamp has a cavity in the upper end for the diamond as the other, but it is shorter, and has a screw cut on the tapering part, and it is only necessary to screw it into the tapering hole in the link to cause it to clasp the diamond $i$ sufficiently for the purpose.

On that part of the chain-standards $g\ g'$, which is around the driving-shaft $b$, are fitted screw-gears $f f'$, which are operated by screws $h\ h'$, which work in their teeth, which screws have shafts fitted into boxes attached to the frame $a$. By turning these screws, the screw-gears and the chain-standards $g\ g'$, and their chains $c\ c'$, can be turned to any position in a plane at right angles to the shaft needful for the work. The chain-gear $f''$ is operated upon by the screw $h''$, and moves the chain-standard $g''$ and its chain $c''$ to any position horizontally needful for the work. On the driving-shaft is formed a screw, $m'$, which works in the screw-gear $l''$, thereby turning the shaft $l^k$ and the screw $m$, which works in the teeth of the screw-gear $l$, and turns it. This screw-gear $l$, being fastened on the shaft $k$ of the trucks $j\ j$, will cause them to turn when it turns, and at the same time cause the machine to move along on its track.

The device for cutting marble with a disk having diamonds in its edge is constructed as follows: The slide $r$ is arranged on a projection of the frame $a$, shown at fig. 7, so that it can move laterally by a screw, or otherwise, and be fixed at any desirable point by the set-screws $t\ t$. In the outer end of this slide $r$ is a box for the upright shaft $o$, which has the disk $e$ fastened on to its lower end, and the cone-gear on to its upper end. The shaft $p$ is turned by the pulley $p'$, and is formed as shown in cross-section in the enlarged gear $n''$, and so arranged that it will turn the gear $n$ at whatever position said gear may be moved by the slide $r$, so that the said slide may be moved laterally towards the ledge of marble, (which has been cut in a straight line perpendicularly to a given depth for the purpose,) causing the disk $e$ to cut its way into said ledge, and when thus in the ledge the machine may be fed from one end of the ledge to the other, causing the disk $e$ to cut a groove in the ledge in length equal to the distance the machine has moved.

Now, in case the projection on the frame $a$, on which the slide $r$ is fitted, was perpendicular instead of horizontal, as shown in the drawings, then the slide $r$ would move perpendicularly, and the channel cut by the disk $e$ would be a perpendicular channel.

In describing the use and operation of my machine in quarrying marble, the first thing to be done is to clear off the imperfect marble and level the quarry. Then rails, D, are laid for the trucks $j\ j$ to run on across the quarry. The machine is then placed on them, and the chain-standards $g\ g'$, with their diamond-chains, are pressed on to the upper surface of the marble, causing the diamonds to cut into it about the depth represented at C, fig. 2, where a section of marble is shown below the cut, the ledge of marble extending up to the track D; or, in other words, each time the machine passes across the ledge it will make a cut to the depth of about half the diameter of the chain-gear $w$ with the chain on it. The feeding then commences by the screw $m'$ moving the screw-gear $l''$, with its shaft $l'$, and screw $m$, which turns the shaft $k$ and its trucks $j\ j$ through the screw-gear $l$, and these trucks revolving, cause the machine to move along on the tracks D D, meantime the diamond-chains $c\ c'$ cutting their channels through the marble. There may be four diamond-chains in each machine, two at each end, so that the channels may be cut entirely from one side of the quarry to the other without turning the machine round on the track; also it will be needful in some cases to place the driving-shaft $b$ and its chains nearer to the end of the machine than it is represented on the drawings, perhaps immediately over the trucks $j'\ j'$, and those at the other end of the machine also near to the end, enabling the machine thereby to cut close to the side of the quarry. When, in this way, channels are cut at the required distances from each other all over the quarry, and others across these, if desired, then one course (or more if needed) of these blocks is taken out at one side of the quarry as low as the bottom of the channels, then the tracks D D are laid at the bottom of the space thus made, and the machine placed on them, and either the diamond-disk $e$ or the diamond-chain $c''$ is used in the way herein described to cut underneath one course of the blocks of marble, the sides and ends of which are already cut, and when these are removed, the track and machine are moved to next course, which is in like manner cut off on the under side, and so on to the opposite side of the quarry, and then the quarry will again be ready for perpendicular channelling, as in the first instance.

It may be remarked here that in using these diamond-chains or disks for channelling, water must be used in the channel for the double purpose of washing away the dust or small portions of marble cut out by the diamonds, and to keep the diamonds cool while at work, as they may be injured by too much heat.

I may also remark here that I have drawn all the gears in my machine only to the pitch-line, omitting to draw the teeth, which will be understood by any one conversant with the present state of the arts in constructing my machine.

Having thus described my invention, I will state my claim to be—

1. In marble-cutting machines, the combination of the diamond with a chain, in the manner and for the purpose described.

2. The clamps $u\ u'$, in combination with the diamond, in the manner specified and for the purpose set forth.

3. In machines for cutting marble and other stone, the combination of the diamond-chain $c$, the chain-gears $w\ w'$, and the standard $g$, arranged and operating as described.

4. A device for moving the chain-standard to any position, consisting of the screw $h$, the worm-gear $f$, combined with the chain-standard, constructed and operating as described.

5. In marble-cutting machines, feeding the machine along while it is working by communicating motion from the driving-shaft to one or more of the trucks, substantially as described and for the purpose set forth.

6. A device for cutting underneath blocks of marble in a quarry, consisting of a diamond-chain, chain-standard, and upright shaft, all arranged, as described, to cut grooves in a horizontal plane, in connection with an apparatus for feeding the machine along while it is working, in the manner and for the purpose described.

7. A device for cutting channels underneath blocks of marble in a quarry, consisting of a disk, $e$, on an upright shaft attached to the slide $r$, working in the manner described, in connection with a feeding-apparatus to feed said disk along while working, in the manner and for the purpose set forth.

WILLIAM WICKERSHAM.

Witnesses:
A. D. PARKER,
JOHN J. LOUD.